United States Patent
Straub

(10) Patent No.: US 10,922,074 B2
(45) Date of Patent: Feb. 16, 2021

(54) DEFERRED STATE MUTATION

(71) Applicant: Oracle International Corporation, Redwood Shores, CA (US)

(72) Inventor: Christian Straub, Redwood City, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 16/003,016

(22) Filed: Jun. 7, 2018

(65) Prior Publication Data

US 2019/0095198 A1 Mar. 28, 2019

Related U.S. Application Data

(60) Provisional application No. 62/629,520, filed on Feb. 12, 2018, provisional application No. 62/564,943, filed on Sep. 28, 2017.

(51) Int. Cl.
| | |
|---|---|
| *G06F 8/71* | (2018.01) |
| *G06F 9/451* | (2018.01) |
| *G06F 8/30* | (2018.01) |
| *G06F 9/52* | (2006.01) |
| *G06F 3/0483* | (2013.01) |
| *G06F 8/40* | (2018.01) |

(52) U.S. Cl.
CPC .............. *G06F 8/71* (2013.01); *G06F 8/30* (2013.01); *G06F 9/451* (2018.02); *G06F 9/52* (2013.01); *G06F 3/0483* (2013.01); *G06F 8/40* (2013.01)

(58) Field of Classification Search
CPC .......... G06F 8/71; G06F 9/451; G06F 3/0483; G06F 8/34
See application file for complete search history.

(56) References Cited

U.S. PATENT DOCUMENTS

| | | | |
|---|---|---|---|
| 10,050,797 B2* | 8/2018 | Garrett | G06F 11/3656 |
| 2002/0059567 A1* | 5/2002 | Minamide | G06F 8/51 717/151 |
| 2003/0217190 A1* | 11/2003 | Devine | G06F 8/34 719/318 |

(Continued)

OTHER PUBLICATIONS

Akihiko Tozawa et al., "Copy-on-write in the PHP language," 2009 [retrieved on Jul. 18, 2019], Proceedings of the 36th annual ACM SIGPLAN-SIGACT symposium on Principles of programming languages, pp. 200-212, downloaded from <url>:https://dl.acm.org/. (Year: 2009).*

*Primary Examiner* — S. Sough
*Assistant Examiner* — Stephen D Berman
(74) *Attorney, Agent, or Firm* — Trellis IP Law Group, PC

(57) ABSTRACT

An embodiment provides deferred state mutation. Information defining action chains implementing part of a client application is received. The received information includes an explicit computer executable instruction to modify a global state associated with each action chain. Computer executable instructions are automatically generated for each of the action chains to create respective private views of the global state for each of the action chains. A separate implicit computer executable instruction is automatically associated with each of the explicit computer executable instructions. The implicit computer executable instructions are executed during runtime of the client application instead of the respective explicit computer executable instructions.

19 Claims, 11 Drawing Sheets

(56) References Cited

U.S. PATENT DOCUMENTS

| | | | | |
|---|---|---|---|---|
| 2005/0273757 A1* | 12/2005 | Anderson | ............... | G06F 8/75 |
| | | | | 717/100 |
| 2006/0225031 A1* | 10/2006 | Petersen | ............... | G06F 8/51 |
| | | | | 717/104 |
| 2007/0005342 A1* | 1/2007 | Ortscheid | ............... | G06F 8/33 |
| | | | | 704/9 |
| 2013/0007717 A1* | 1/2013 | Bates | ............... | G06F 11/362 |
| | | | | 717/125 |
| 2013/0086551 A1* | 4/2013 | Archer | ............... | G06F 8/34 |
| | | | | 717/113 |
| 2014/0173415 A1* | 6/2014 | Kattil Cherian | ............... | G06F 9/54 |
| | | | | 715/234 |
| 2015/0052400 A1* | 2/2015 | Garrett | ............... | G06F 11/3656 |
| | | | | 714/37 |

\* cited by examiner

Select Event

| General Events | Button Events | Property Changes |

Filter Events auxclick
Fired when a non-primary pointing device button is pressed and released over the element blur
Fired when the element loses keyboard focus click
Fired when the primary pointing device is pressed and released over the element contextmenu
Fired when the element's associated context menu is invoked, before it is displayed.

dblclick
Fired when a pointing device button is clicked twice over the element drag
Fired continuously while dragging the element or text selection dragend
Fired when dragging is ended for the element or text selection (whether because a pointing device button is released or the drag operation is cancelled)

dragenter
Fired when a dragged element or text selection is moved over a valid drop target

— 710

Select

DEFERRED STATE MUTATION

CROSS REFERENCES TO RELATED APPLICATIONS

This application claims the benefit of U.S. Provisional Patent Application Ser. No. 62/564,943, entitled DEFERRED STATE MUTATION (ORACP0207P-1/ORACP180299-US-PSP), filed on Sep. 28, 2017 and U.S. Provisional Patent Application Ser. No. 62/629,520, entitled DEFERRED STATE MUTATION, filed on Feb. 12, 2018 (ORACP0207P-2/ORACP180299-US-PSP-2), which are hereby incorporated by reference as if set forth in full in this application for all purposes.

BACKGROUND

When a process is executing in a computing environment using shared variables or other data, it can be difficult to ensure proper operation when other processes also use the shared data. Conflicts can arise where the process is operating in parallel with one or more of the other processes, or when the process may not be guaranteed to have uninterrupted execution. One area where shared data conflicts can occur is in web application development. An example of a type of web application is a browser based application that can use HyperText Markup Language (HTML), Javascript™, etc. languages to implement a "stateless" approach to execution.

There are various protocols and standards within browser based applications, such as Service Oriented Architecture (SOA), Representational State Transfer (REST), etc. that allow complex systems to be designed as web applications. As more features, functionality and complexity are introduced into web applications, the likelihood of data conflict issues grows, yet such intermittent errors can be difficult to reproduce and correct. This may be especially true in a web application development phase where multiple different human developers create functionality independently, and where the functionality is intended for execution by a single user as a coherent or integrated experience at an execution phase. The functionality may be, for example, for online purchasing of goods or services where product browsing, comparison, purchasing, record-keeping, and other functions can be performed seemingly concurrently to the user, or without the user having to wait for completion of a particular function.

SUMMARY

An embodiment provides deferred state mutation. Information defining action chains implementing part of a client application is received. The received information includes an explicit computer executable instruction to modify a global state associated with each action chain. Computer executable instructions are automatically generated for each of the action chains to create respective private views of the global state for each of the action chains. A separate implicit computer executable instruction is automatically associated with each of the explicit computer executable instructions. The implicit computer executable instructions are executed during runtime of the client application instead of the respective explicit computer executable instructions.

An embodiment provides a non-transitory processor-readable storage device including instructions for a method of providing deferred state mutation, the method comprising: receiving information defining action chains implementing part of a client application, wherein the received information includes an explicit computer executable instruction to modify a global state associated with each action chain; automatically generating computer executable instructions for each of the action chains to create respective private views of the global state for each of the action chains; and automatically associating a separate implicit computer executable instruction with each of the explicit computer executable instructions, wherein the implicit computer executable instructions are executed during runtime of the client application instead of the respective explicit computer executable instructions.

A further understanding of the nature and the advantages of particular embodiments disclosed herein may be realized by reference of the remaining portions of the specification and the attached drawings.

BRIEF DESCRIPTION OF THE DRAWINGS

FIG. 7 depicts a web page that includes a list of events, according to one.

DETAILED DESCRIPTION OF EMBODIMENTS

Figure 1:
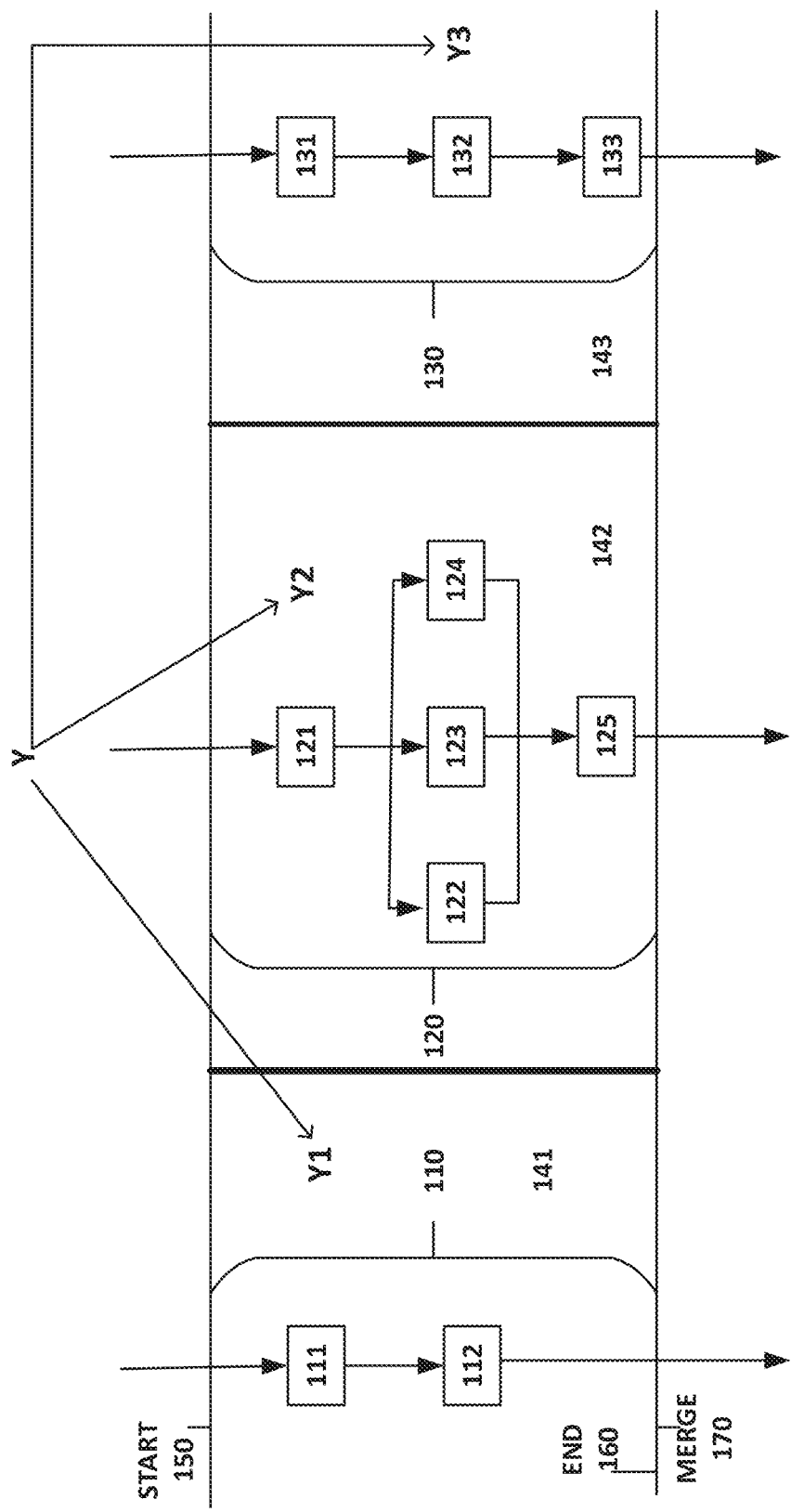
FIG. 1 depicts action chains executing in parallel, according to one embodiment.

In a highly parallel system, multiple processes may update shared state simultaneously, resulting in potential conflicts. A process can be a portion of code that is executed to perform a predetermined function. Although specific functions may be discussed, such as a user interacting with a client application's user interface, it should be apparent that features described herein may be adaptable for use with any other functionality, as desired. Conventionally, the problem of multiple parallel processes simultaneously updating shared state was either not handled at all or sophisticated programming mechanisms, such as locks, mutexes, or critical sections, were used. Writing code that uses such sophisticated programming mechanisms requires the developer to be have sophisticated programming skills. Various embodiments address these issues without using sophisticated programming mechanisms in a manner that enables an unsophisticated developer to create the code. Deferred state mutation enables an unsophisticated developer to create computer executable instructions for a client application while avoiding the potential conflicts. This allows each process to have a consistent view of the shared state, and a predictable way to update that shared state when a respective process completes.

In event driven applications, processes respond to events to perform certain actions. Since events can occur simultaneously and the processing of those events can occur asynchronously, any state that may be mutated in response to an event can and typically will be in contention.

When designing and implementing event handlers, it can be very difficult to account for the fact that other external handlers can be mutating state that are used simultaneously. For example, take the following exemplary pseudo code:
  onAdditionButtonClick:
  set result=sum(A, B)
  print A, "+", B, "=", result Assume, for example, that initially state A has the value 3 and state B has the value 2 providing a result of 5 when the instruction "set result=sum(A,B)" is executed (also referred to as "the set"). Further, assume that the state A was changed, or mutated, for example from 3 to 2, by a separate handler or process after the set but prior to the print. In this case, the nonsense 2+2=5 may be printed by the "print A, '+', B, '=', result" instruction.

The above example illustrates in a simple example, the problems with shared variable A which can be written to by two or more processes or handlers. First, there is an issue of what is the current value of A, as the two processes are running asynchronously (e.g., first process:onAdditionButtonClick, and the second process writing to A). The second issue is when process detects there is a bug, e.g., we get printed "2+2=5" instead of "3+2=5", determining what was the initial value of A and B at the start of the pseudo code so processing can roll back to a known starting point.

In the current development environment there can be very many processes running asynchronously and accessing many shared variables, or to put it another way, a variable may be shared asynchronously by two or more processes. Thus, there is a need, for debugging purposes, of snapshotting a variable before it goes through being modified. By modified in one embodiment, this means being written to, as opposed to only being read. In one embodiment, this snapshot can be accomplished by not modifying the original shared variable value, but creating a local copy for the process that wants to do a modification. There will be a local copy for each process that wants to do an asynchronous change to the original shared variable value. The process local variable can be rolled back, if needed for debugging, to the original shared variable value. At some point all the local copies are resolved to a final value which will replace the original shared variable value. In one embodiment the local copy is created by a smart wrapper which only creates a local copy when a variable is being written to and not when being read.

According to one embodiment, state is captured prior to the event handler being executed. That state can then be isolated from other handlers. According to one embodiment, it can be freely mutated only by that handler and those mutations are visible to future actions of that same handler. When the handler completes, that state is merged back into the larger system. While conflicts can still exist during this merge, they occur after logical processing has occurred and can thus be better tracked and managed.

FIG. 1 depicts action chains 110, 120, 130 executing in parallel, according to one embodiment. Note that although functions or action chains may be described as executing in "parallel" it is well-known that the idea of parallel execution is commonly used to describe time-sliced processing using a single processor where at a micro-execution level only one action chain at a time is being executed. However, at a higher macro-execution level such as the application instruction level it appears that action chains are acting concurrently or in parallel. In general, embodiments described herein may be adaptable to any execution scheme such as single or multi-processor architectures, multi-threaded, multi-pipelined, time shared processing, distributed or networked (e.g., cloud) processing, etc.

The action chains 110, 120, 130 are chains of actions 111, 112, 121-125, and 131-133. The boxes represent the actions 111, 112, 121-125, and 131-133 and the arrows represent the flow of control from one action to another in the respective action chains. For example, the execution is performed in the direction of the arrow. Actions can be performed serially in an action chain as indicated by a first single box connected with a second single box with an arrow. Actions can also be performed in parallel as indicated by the three boxes 122-124 for the second action chain 120. More specifically, execution from the first action 121 in the second chain 120 can fork into three parallel actions 122-124 and then join again in a lower action 125. Alternatively, one or more actions may be conditionally executed so that not all of the actions in the chain will be performed on each invoking of the action chain. One or more actions can be the children of a previous action. For example, the first action 121 in the second action chain 120 is the parent and the three actions 122-124 that branch from it are the children. In other examples, action 111 is the parent of action 112 and action 131 is the parent of action 133.

Actions can perform various types of processing. For example, one action may read a value from a variable. Another action may write a value to a variable. In another example, there may be a desire to obtain several stock prices that are under a certain threshold and to provide one alert if any of them are under a certain threshold. In this case, an action may fork several other actions where each of those actions request stock prices in parallel. Once the stock prices have been obtained, an action they join into may determine which are below the threshold and provide that information in a single alert. In still another example, a web page may be designed to allow a user to buy several songs by selecting "buy" buttons below each of the songs displayed in a list. Selecting a "buy" button triggers an event that starts an action. Each of the actions can process the buys in parallel.

According to various embodiments, each of the action chains are isolated by partitions 141, 142, 143 (also referred to as "isolations") from each other as represented by the lines separating the action chains. In other words, each action chain has a private view of the state it operates on. For example, Y represents a global state. Examples of state include variables and data streams. Each action chain is provided its own private view of the global state when the action chain begins execution. For example, Y1 is the first action chains private view of Y, Y2 is the second action chains private view of Y, and Y3 is the third action chains private view of Y.

In one embodiment the views Y1, Y2, Y3 can be implemented using variables that are local to each of the three action chain 110, 120, 130 isolations 141, 142, 143. Thus, each local variable Y1, Y2, Y3 can be modified by its respective action chain 110, 120, 130 without modifying global state Y. In effect the global state Y has been snap-shotted and is the original state for Y1, Y2, Y3 in case an action chain has a bug and the state of that action chain can be rolled back to the start state for debugging purposes. The views Y1, Y2, Y3 are examples of mutable states because they represent a version of the state Y and can be modified by the respective action chains. The action chains are examples of processes. Note that Y3 is created at a different time than Y1 and Y2. Thus, at action 131 of the third action chain 103, Y may be read only so the value of global variable Y can be used. At action 132, global variable Y is written to and before this happens a local copy Y3 is created and Y3 not Y is written to. Thus, in one embodiment, local variables are created dynamically. In one embodiment, at the end 160 of the action chain a conflict resolution 170 is run to determine from the final values of Y1, Y2, and Y3, what is the new value for global state Y. In one embodiment, the last variable Y1, Y2, or Y3 written to is the new value for global state Y.

A user interface of a design time visual development tool, according to one embodiment, enables an unsophisticated human developer to create visual representations of the action chains. For example, the user interface can display icons of boxes and arrows. The developer can drag and drop icons of boxes and arrows joining the boxes to create visual representations of the action chains. The tool generates the computer executable instructions for a client application based on the visual representations of the action chains. Typically, the generated computer executable instructions implement a user interface for the client application. The action chains are referred to as a "declarative system" because they are created by wiring together atomic boxes to do simple actions using, for example, arrows and boxes. This hides many of the complexities of the computer instructions from the developers, including the complexities involved in parallel processing. The developers are known as "declarative developers" or "declarative programmers." Such declarative developers do not understand how to use sophisticated programming techniques such as locks, mutexes, partitions, and critical sections (also referred to as "protected sections").

According to various embodiments, the declarative programmer (also referred to herein as "unsophisticated developer," and "unsophisticated human developer") specifies explicit computer executable instructions by creating the action chains via the tool. However, according to various embodiments, the tool automatically generates at least one implicit computer executable instruction that is executed during run time to replace at least one of the explicit computer executable instructions that was specified during design time. For example, instead of executing an explicit computer executable instruction assigning a value to the shared state Y, an implicit computer executable instruction to assign that same value to the private view Y1 is executed.

The implicit computer executable instructions are hidden from the declarative programmer. For example, although, execution of the implicit instruction replaces execution of the explicit instruction, the declarative programmer continues to see the explicit computer executable instructions if they display the action chains that they created.

The tool can configure the client application's instructions with different modes for displaying the client application's instructions. For example, a first mode can be used for unsophisticated programmers and a second mode can be used for sophisticated programmers. The first mode displays the explicit instructions and hides the implicit instructions from the unsophisticated programmer. The second mode displays the actual instructions of the client application including the implicit instructions. Either of the modes can be used to display the source code instructions of the client application or to display the instructions as they are being executed as part of debugging.

Assume for the sake of illustration that Y has the value of 3 when the action chains start 150. Y1, Y2, and Y3 will then have the value of 3. Assume that the first action chain changes Y to 4. Each of the action chains include an explicit computer executable instruction to modify the variable Y, that instruction is changed by the tool for the respective action chains to implicit computer executable instructions to instead modify variables Y1, Y2, and Y3 respectively. For example, when each of the action changes explicit instructions modify Y, the actual implicit instructions instead modify Y1, Y2, and Y3 respectively. In another example, assume that Y has the value of 3 when the action chains start. When the explicit computer executable instruction of the first chain modifies Y from the value of 4, an implicit computer instruction instead modifies Y1 to 4, leaving the value of Y as 3. Further, the values of Y2 and Y3 remain 3 since they are isolated from the first action chain.

When execution of the action chains end, the values of Y1, Y2, and Y3 will be resolved (also referred to as "merged" or "rationalized"). According to one embodiment, the value of the last action chain is saved. For example, if the third action chain was the last to complete, Y would be assigned the value of Y3. Typically, there is no further use for the state Y so the values of Y1, Y2, and Y3 do not matter.

The words "mutation" and "change" can be used interchangeably. For example, mutating a state means changing the state. More specifically, changing the value of the variable Y from 3 to 4 is an example of mutating or changing it.

Without the isolations 141-143 and the private views Y1, Y2, Y3, when one of the action chains, such as action chain 110, explicit computer executable instructions modifies Y to the value of 4, the other action chains, such as action chains 120, 130, will also obtain the value 4 when they access Y. Thus, without the isolations 141-143 implementing the private views, the operations of each action chain will affect the others in unanticipated ways. To further complicate matters, different developers may create different action chains. Therefore, no one developer could possibly know what types of operations are being performed on a global view by other action chains.

Although for the sake of simplicity, the action chains, as depicted in FIG. 1, appear to start and end at the same time. However, they most likely start at different times and they take different amounts of time to execute.

One embodiment provides for taking a "snapshot" (i.e., storing the state) of all or a portion of the data space or executing environment of an execution object. In an embodiment relating to web applications the execution object is referred to as an "action chain" and it is a series of programmatic actions along with logical flow such as sequential, branching, conditional, or other instruction execution sequences. An action chain can be associated with a user interface (UI) control, browser tab, browser page, or any other desired item, object or event.

An embodiment, "deferred state mutation," is an approach of automatically changing a developer specified computer executable instruction, such as Y=Y+1, that modifies a global variable Y into a tool generated computer executable instruction, such as Y1=Y1+1, that modifies a local variable Y1 instead. The mutation of the global variable is then deferred until after the action chains 110, 120, 130 modifying that global variable have ended 170 their execution, thus, conflicts between the action chains' updates of the global variable are prevented. A developer specified computer executable instruction is also referred to herein as an "explicit computer executable instruction" and a tool generated computer executable instruction is also referred to herein as an "implicit computer executable instruction." The developer and tool generated instructions are non-transitory computer readable instructions that are stored on a non-transitory processor-readable storage device, according to one embodiment.

In one embodiment, prior to executing an action chain, a determination is made as to whether any shared data (e.g., global variables) could be modified or used by other action chains. If so, the shared data that might be changed is stored. Snapshots are also taken for other action chains that might modify or use shared data. At the end of execution of the action chains that can cause a conflict, a decision is made as to which of the conflicting values should actually be used to update the shared value. The decision can be made on simple criteria such as the first, or last value changed. Or other criteria can be used. In a preferred embodiment, the resolution of the conflict is handled by environment code, or instructions. Environment code provides control of execution whereby implicit instructions that are created by the development environment replace explicit instructions that are specified by the unsophisticated human developer. The environment code controls the execution of the unsophisticated human developer specified code so that the unsophisticated human developer does not need to be concerned with data conflicts while they are writing their respective portions of a client application. The environment code can also be used to merge 170 the values of the local variables Y1, Y2, Y3 into corresponding a global variable Y, as discussed herein.

Figure 2:
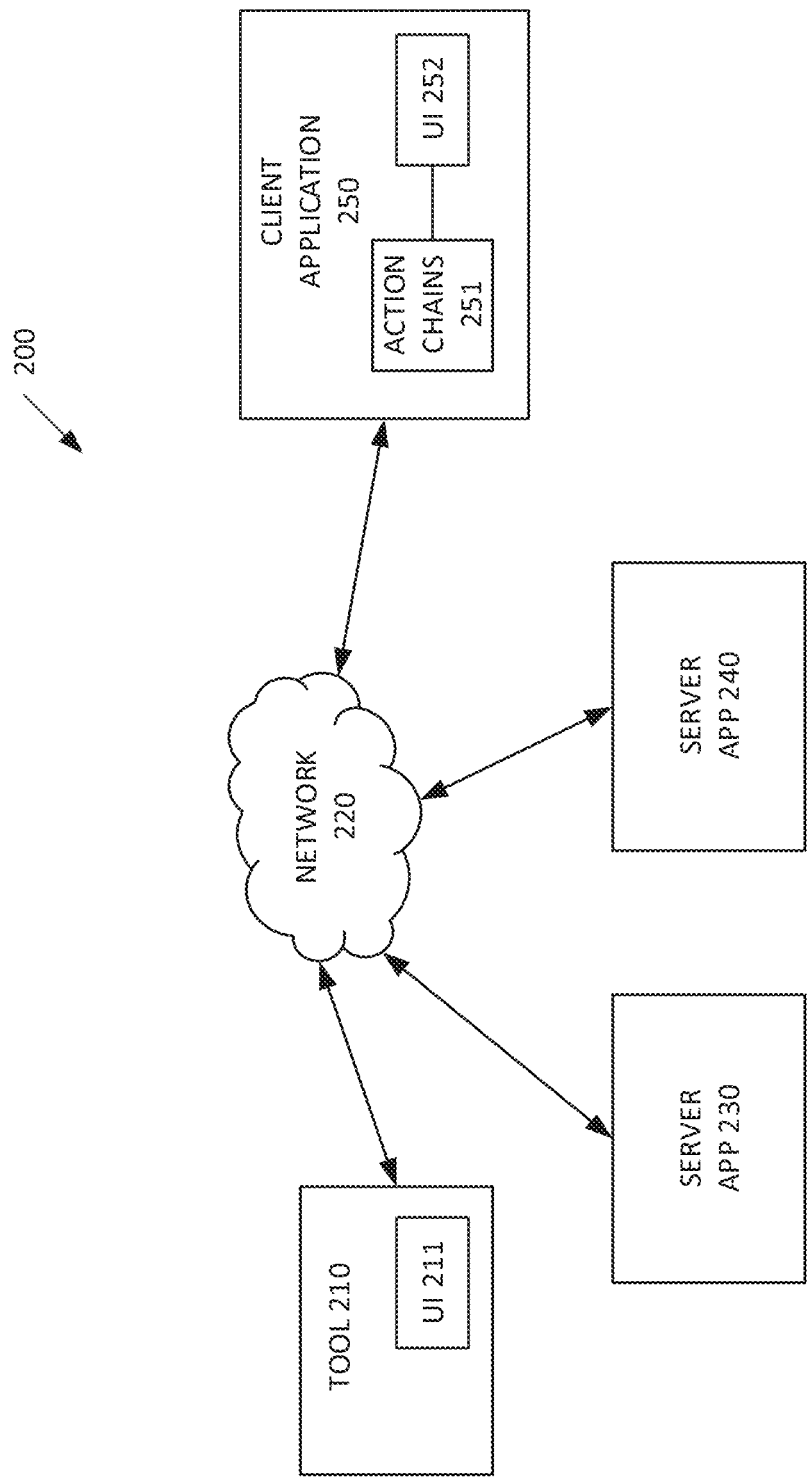
FIG. 2 depicts a block diagram of a system, according to one embodiment.

FIG. 2 depicts a block diagram of a system 100, according to one embodiment.

The system 200 includes a design time visual development tool 210, a client application 250, server applications 230, 240, and a network 220. The tool 210, the client application 250, and the server applications 230, 240 communicate over a network 230. The client application 250, according to one embodiment, is executed by the tool 210.

The tool 210 provides a user interface (UI) 211 that enables unsophisticated developers the facilities for creating action chains 251. Action chains 110, 120, 130 depicted in FIG. 1 are examples of action chains 251 depicted in FIG. 2. The client application 251 includes a user interface 252 that is implemented with action chains 251 created with the user interface 211. The web pages of the user interfaces 211, 252 can be displayed via browsers executing in respective computer systems executing or communicating with the tool 210 and the client application 250. Computer instructions of the action chains 251 can result in requesting and obtaining information from one or more of the server applications 230, 240.

The action chains 251 are executed in response to events. According to one embodiment, the event that cause an action chain to start executing are the direct or indirect result of a user selecting a user interface control in the user interface 252. Examples of user interface controls include buttons, tabs, data entry fields, radio buttons, items in a list that can be selected, and so on. Examples of events include detecting that a user selected a user interface control of the client application's user interface. Other examples of events that can occur in response to selection of a user interface control include detecting that data has been requested, data has arrived, an operation started or completed, or a phase of an operation is about to be started or has completed. Events are well known in the art.

Further, since the events that cause action chains are triggered in response to a user selecting a user interface control, the instructions of the client application 250 and the action chains do not control when an action chain starts.

The boundaries of the direct and indirect results of an action are well defined because the action chains are event driven. More specifically, the boundaries of the instructions in the client computer executable instructions that handle (also known as an "event handler") the event directly or indirectly are determinable. A developer can create code (also known as a "subscriber") that subscribes to an event handler. Since the boundaries of an action's result are determinable and known, the global variables used, directly or indirectly, by an event chain can also be determined.

The boundaries, as discussed herein, and the private views provide isolation between the event chains. The isolations 141-143 are depicted as lines between the event chains 110, 120, 130 in FIG. 1.

Since the events that start execution of the action chains are either directly or indirectly triggered as the result of a user selecting a user interface control, it is impossible to anticipate when the action chains are executed.

Various embodiments provided cloud capabilities. For example, a developer can use the tool 210 to create the client application 250 over the cloud. More specifically, the client application 250, the server applications 230, 240, and the tool 210 are web applications that communicate over the network 220.

Figure 3:
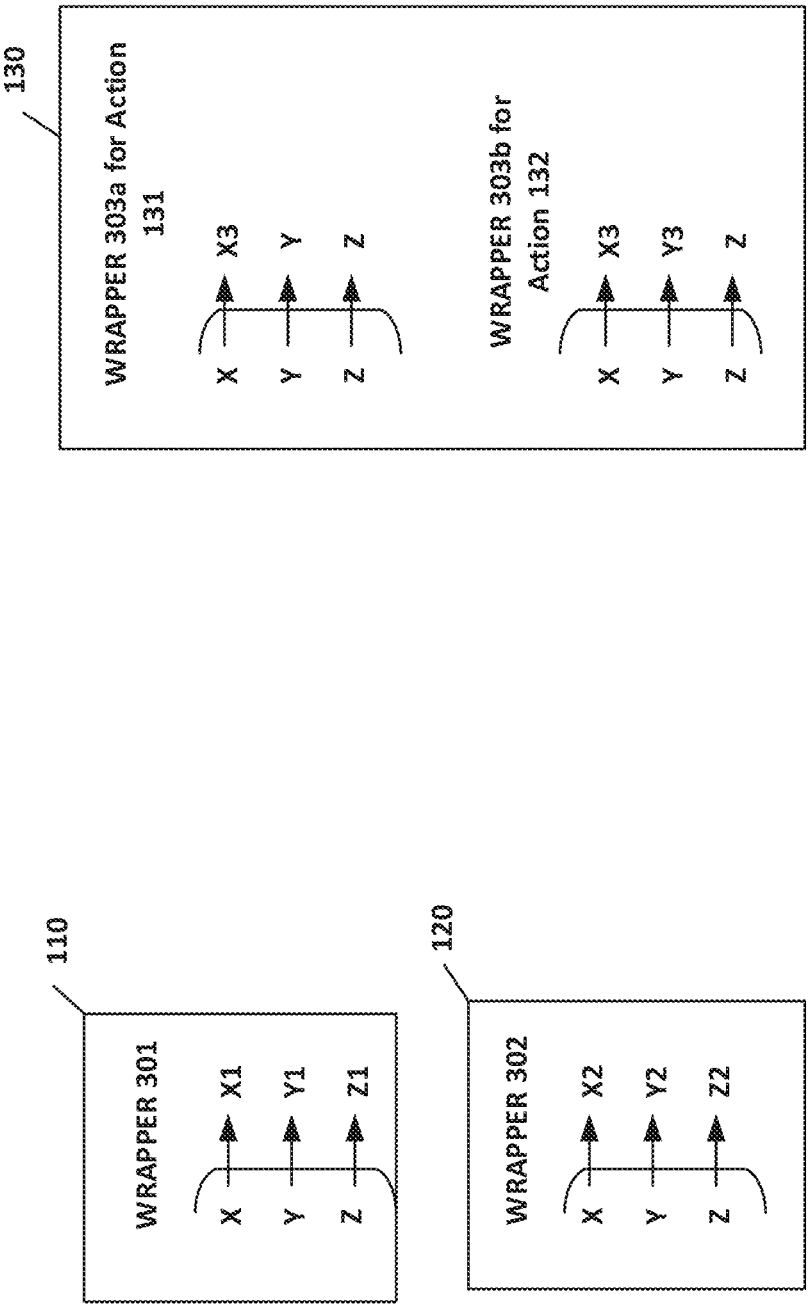
FIG. 3 depicts an implementation of snapshots, according to one embodiment.

FIG. 3 depicts an implementation of snapshots, according to one embodiment.

A snapshot of global variables used by an action chain is taken when the action chain starts execution. FIG. 3 depicts an example of three wrappers, i.e., 301, 302, and 303a/303b for the respective action chains 110, 120, 130 depicted in FIG. 1. Assume that the global variables are X, Y, and Z. In this example, for each action chain, 110, 120, 130, a wrapper or a proxy is used to interface with the global variables X, Y, and Z. That wrapper or proxy is used to isolate, for example, the private views Y1, Y2, Y3 of the respective three action chains from the global state of Y. For action chain 130, the wrapper 303a creates a local copy of global variable X, i.e., local copy X3, but not of global variables Y and Z, because at this point in time, in this example, Y and Z are read only. Thus, the wrapper 303a just passes through the values of Y and Z. At a subsequent time, when Y is written to, wrapper 303b [in this embodiment, wrapper 303a and 303b are the same wrapper code just executed at different points in time] creates a local copy Y3. Action chain 130 uses at this time [action chain 132] its local copy of X, i.e., X3, and Z is just passed through again as it is read only. The wrapper or proxy provides an association between the shared variable Y and the private views Y1, Y2, Y3 that can be used as part of replacing an explicit computer executable instruction to modify Y with respective implicit computer executable instructions to modify Y1, Y2, and Y3 instead during the runtime execution the respective action chains 251 in the client application 250.

Similarly, X1, X2, X3 provide private views for the respective action chains to global variable X; and, Z1, and Z2 provide private views for the respective action chains to global variable Z.

Although for the sake of illustration, FIG. 3 depicts three sets of variables X, Y, and Z for the three respective snapshots, since X, Y, and Z are global variables for the client application, the Xs of each are the same variable, the Ys of each are the same variable, and the Zs of each are the same variable.

Snapshots and the associated wrappers can be nested. For example, if a first action chain starts another action chain, two snapshots will be taken—one snapshot for the parent action chain and a second snapshot for the child action chain. The second snapshot will be nested inside of the first snapshot. In an example, if an action chain starts two other action chains, three snapshots will be taken.

The action chains can read and write to the global variables X, Y, and Z via explicit computer executable instructions specified by a developer of the client application and execution of those explicit computer instructions are replaced with execution of appropriate implicit computer instructions to redirect those operations to the appropriate private views. For example, an explicit computer executable instruction, such as Y=Y+1, can be replaced with in implicit computer instructions to create the wrapper, obtain local storage for a private view Y1, assign Y1 the value of Y, and Y1=Y1+1.

According to one embodiment, snapshots are only taken of variables that will be modified. Snapshots are not taken of read only variables.

According to one embodiment, a private view of a global variable is created just before the global variable is modified.

According to one embodiment, global variables are copied into a wrapper, thus, creating private views. Modifications to the variables are tracked to determine which variable states are changed. Creating private views can be detailed until their respective global variables are to be read, or until another process modifies them.

Referring to FIG. 2, the tool 210 can provide visual application building capabilities that the developer or team use via the cloud to build the action chains 251 that implement parts of the client application 250. Visual Builder Cloud Service (VBCS) is modified to provide various visual application building capability embodiments discussed herein.

The tool 210's user interface 211 generates computer executable instructions for building the client application 250, during design time. The tool's user interface enables an unsophisticated human developer to create action chains with deferred state mutation capabilities for the client application, as discussed herein. The developer may select an option instructing the tool 210 to create action chains 251 with deferred state mutation capabilities. Alternatively, the tool 210 may automatically create computer executable instructions that provide deferred state mutation capabilities in response to the creation of action chains 251 using the tool 210.

Figure 4:
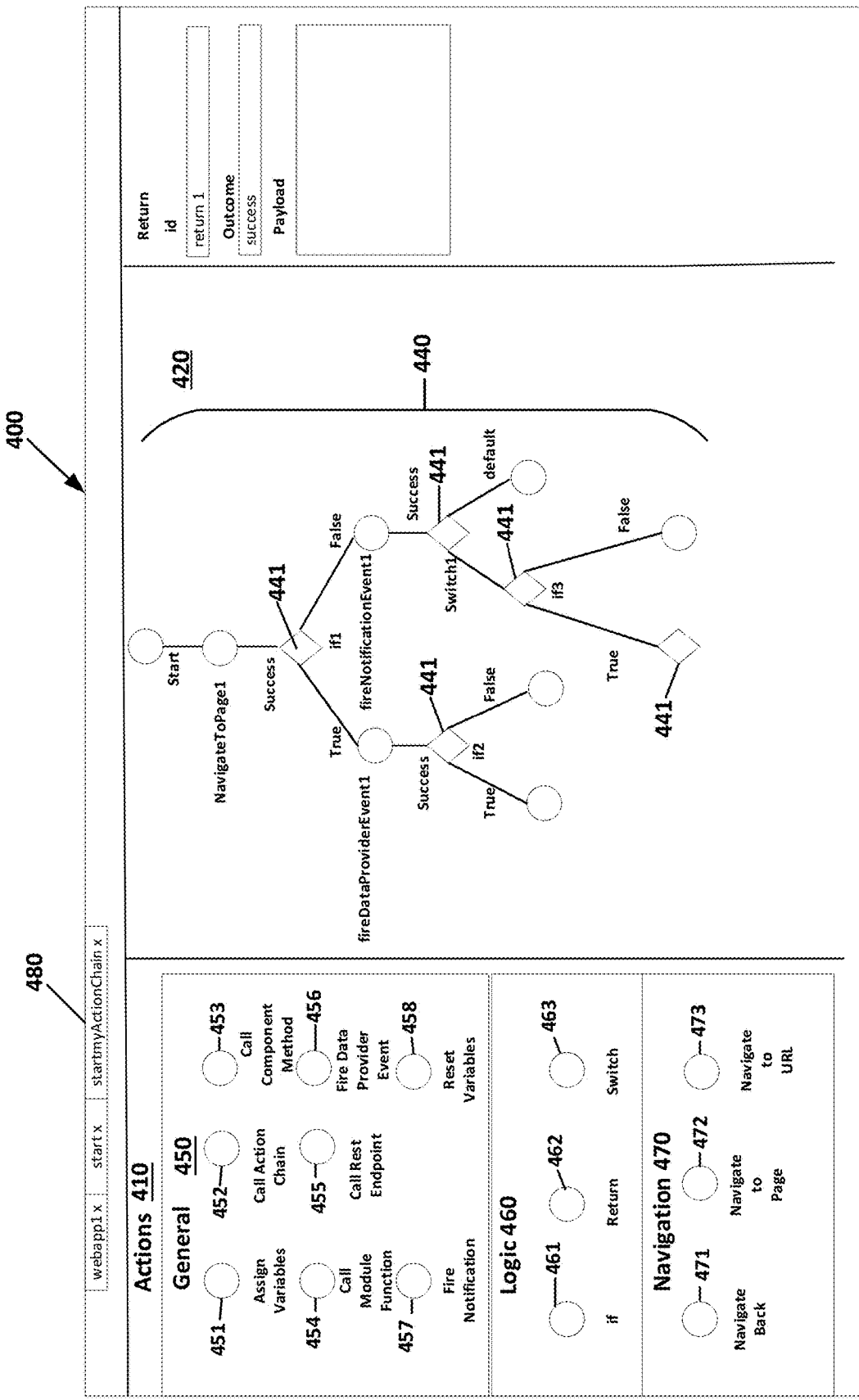
FIG. 4 depicts a screen shot of a page creating an action chain for a button that will be part of the user interface, according to one embodiment.

In an example, the tool's UI 211 lets a developer to customize or create a page for the client application's user interface 252. An in illustration, a button was created. FIG. 4 depicts a page 400 for creating an action chain for a button that will be part of the UI 252, according to one embodiment. Page 400 can be displayed by selecting the startmyActionChain tab 480. A description section can be added. The page 400 of UI 211 includes a palette 410 of actions to the left that can be added to the action chain 440. The middle section 420 of the page 400 depicts a flow diagram that represents one or more sequences of actions in the action chain 440. The diamonds 441 represent "if" statements or branch conditions for determining which of multiple alternate paths the execution of the action chain 440 can take.

The pallet 410 has three sections 450, 460, 470 labeled "general," "logic," and "navigation" as shown in FIG. 4. Each section 450, 460, 470 includes icons that represent actions that can be dragged and dropped into the middle section 420 to create the action chain 440.

The general section 450 has three rows of icons. In the first row of the general section, the first icon 451 represents assign variables. For example, this icon 451 can be used for setting a variable to a different value. The second icon 452 in the first row, represents call action chain. This allows the developer to specify to a call another action chain from this action. The third icon 453 in the first row represents a call component method that lets the developer determine which UI component, like a button, on a page being created for the UI 252 to call.

The second row in the general section also includes three icons. The first icon 454 in the second row is the "call module function" icon. This enables a developer to define their own function in the java script of the page being created for the UI 252. The call module function icon then allows the developer to create code that calls those functions. The second icon 455 in the second row is the "call REST end point" icon. This action allows the developer to create code that calls a REST end point to update data or request data.

The third row in the general section 450 also includes two icons. The first icon 457 in the third row is the "fire notification" icon. It can be used to put a message onto a page that the action chain is being used to implement. The second icon 458 in the third row is the "reset variables" icon. It can be used to reset the value of a state back to its default value.

The logic section 460 includes three icons 461-463. This section enables the creation of logic flow in the action chain. The first icon 461 in the logic section represents an action for an "if" condition. The second icon 462 in the logic section represents a switch. The third icon 463 in the logic section represents a return. The third icon 463 can be used at the end of an action chain to return a specific outcome or value. The third icon 463 is useful when calling an action chain from another action chain.

The navigation section 470 includes three icons 471-473. The first icon 471 in the navigation section enables the developer to create code that navigates to the previous page. The previous page in this case would be the previous page in the client computer 250's browser's history. The second icon 472 in the navigation section enables the developer to create code that navigates to a page in a client application 250 during run time. For example, this icon 472 can be used to create computer executable code that navigates from an expense report page of the client application's UI 252 to an employee page of the client application's UI 252. The third icon 473 in the navigation section enables the developer to create code that navigates to a URL that is not in the currently executing client application 250.

Figure 5:
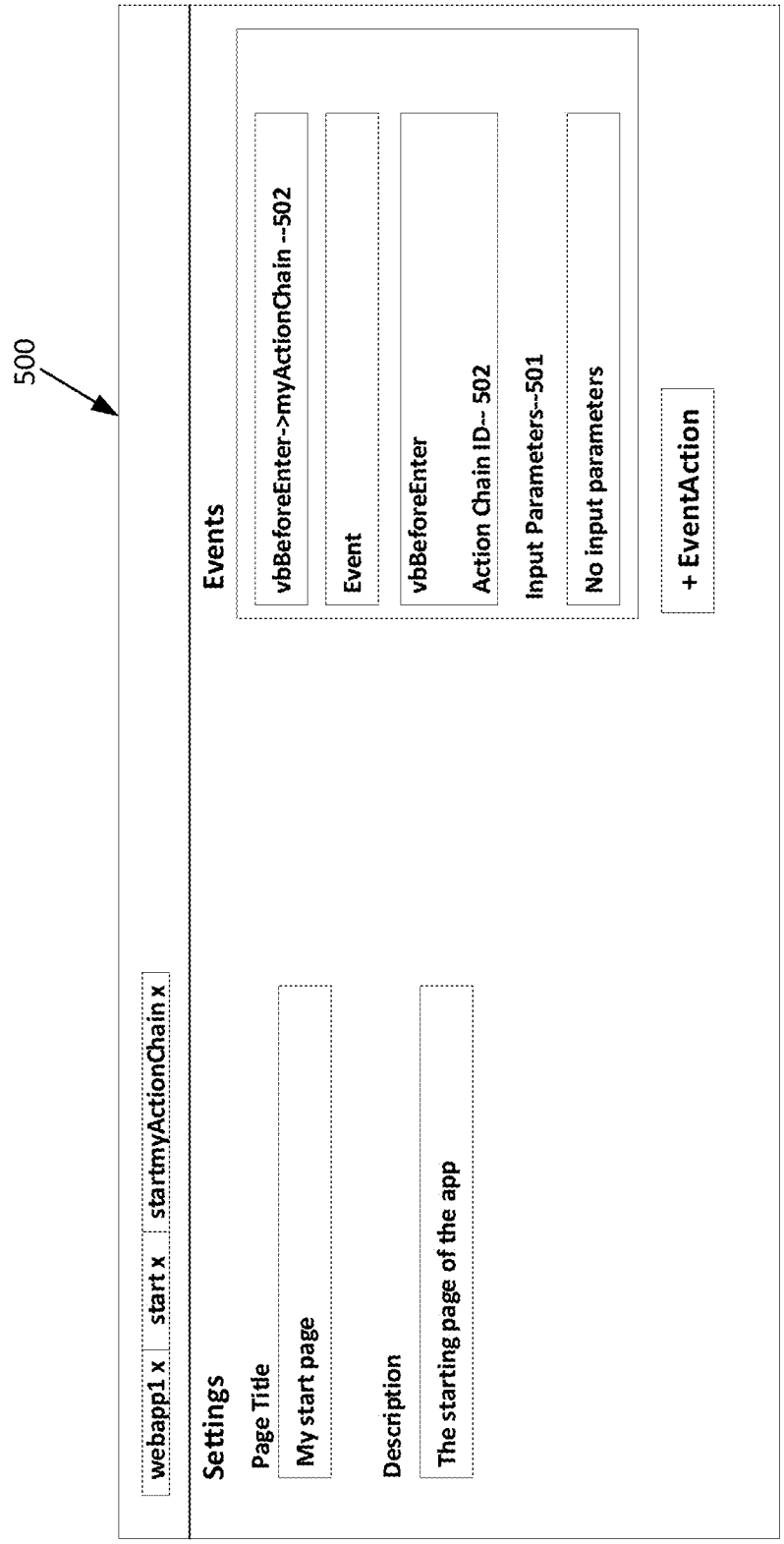
FIG. 5 depicts a web page that the developer can use to map input parameters they want for that action chain, according to one embodiment.

FIG. 5 depicts a web page 500 that the developer can use to map input parameters they want for that action chain, according to one embodiment. For example, in FIG. 5, the developer can click on "input Parameters" 501 that appears below myActionChain 502 to map input parameters.

Referring to the page 500, an action chain has an identifier (ID) that can be specified in the Action Chain ID field 503.

Figure 6:
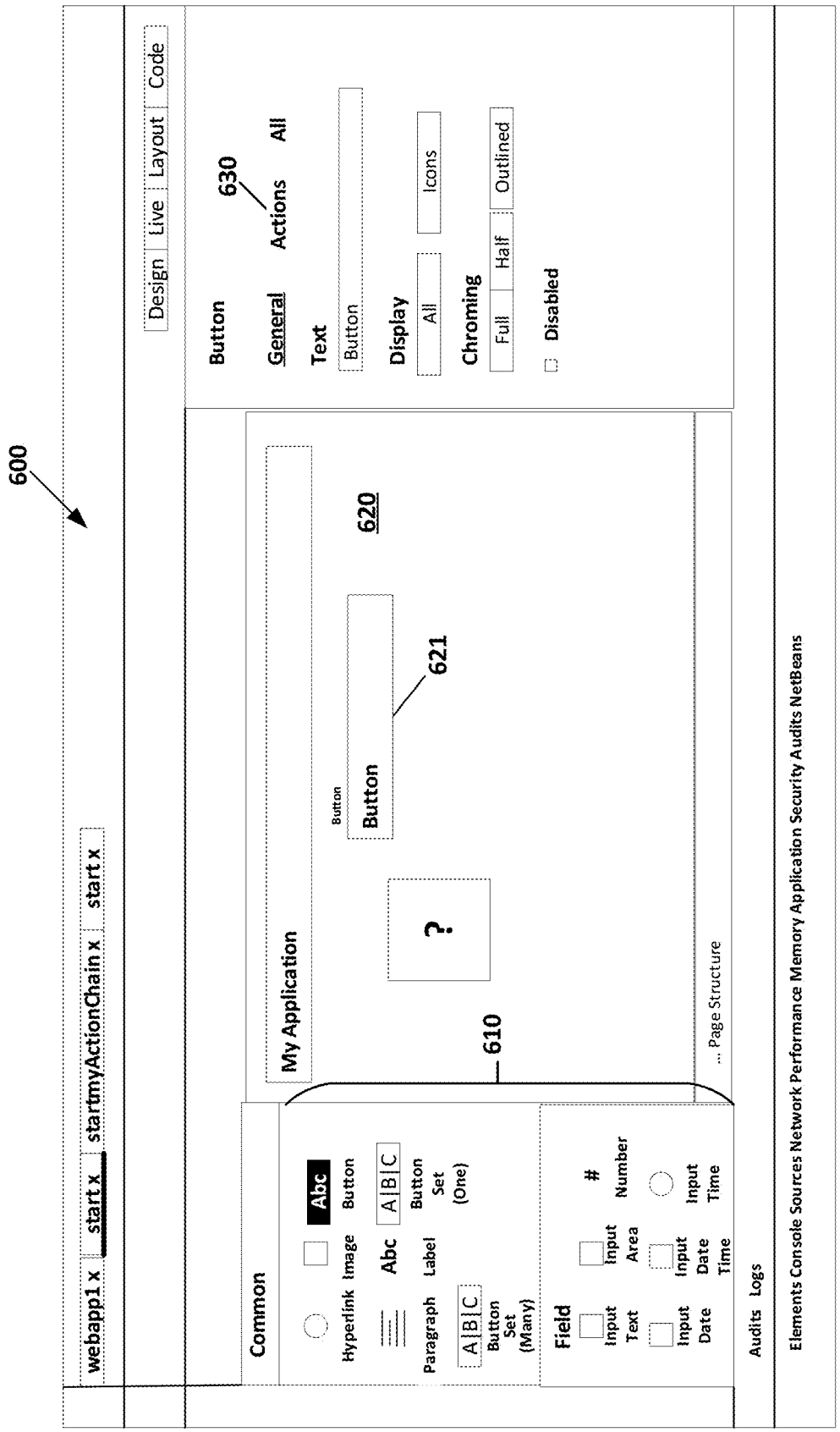
FIG. 6 depicts a web page that the unsophisticated developer can use to bind a UI component to component events, according to one embodiment.

FIG. 6 depicts a web page 600 that the unsophisticated developer can use to bind a UI component to component events, according to one embodiment. For example, the developer can drag a UI component from the pallet 610 on the left into the pane 620 in the middle. In this example, the dragged UI component is a button 621.

FIG. 7 depicts a web page 700 that includes a list of events 710, according to one embodiment. If the developer selects the action tab 630 depicted in the page 600, a list of events 710, as depicted in FIG. 7, will be displayed in response. The developer can select one of the events displayed in FIG. 7 to bind to the UI component, such as the representation of the button 621, displayed in the middle pane 620.

In addition, the developer can click on a representation of a UI component, such as the button 621, to display properties for that UI component.

If the developer clicks on the action tab 730 in the page 600 in FIG. 6, the list of events 710 depicted in FIG. 7 is displayed in response. The developer can select one of the events in the displayed list 710 to bind to the UI component, which in this illustration was a button 621 that the developer previously selected from web page 600 (FIG. 6).

The list of events 710 includes events such as unclick that is fired when a non-primary pointing device button is pressed and released over an element, blur that is fired when the element loses keyboard focus, click that is fired when the primary pointing device button is pressed and released over the element, contextmenu that is fired when the element's associated context menu is invoked, before it is displayed, double click (also referred to as "dblclick") that is fired when a pointing device button is clicked twice over the element, drag that is fired continuously while dragging the element or a text selection, drag end that is fired when dragging is ended for the element or a text selection (whether because a pointing button is released or the drag operation is cancelled), and dragenter that is fired when a dragged element or text selection is moved over a valid drop target.

Referring to FIG. 2, although the tool's user interface 211 was illustrated in the context of creating a button for the client application 250's user interface 252, embodiments are well suited for other types of user interface controls, such as drop down menus, tabs, menus, radio buttons, lists and so on. An action chain can be triggered directly or indirectly as the result of a user interacting with a user interface control, as discussed herein.

An Illustration of a Method

Figure 8:
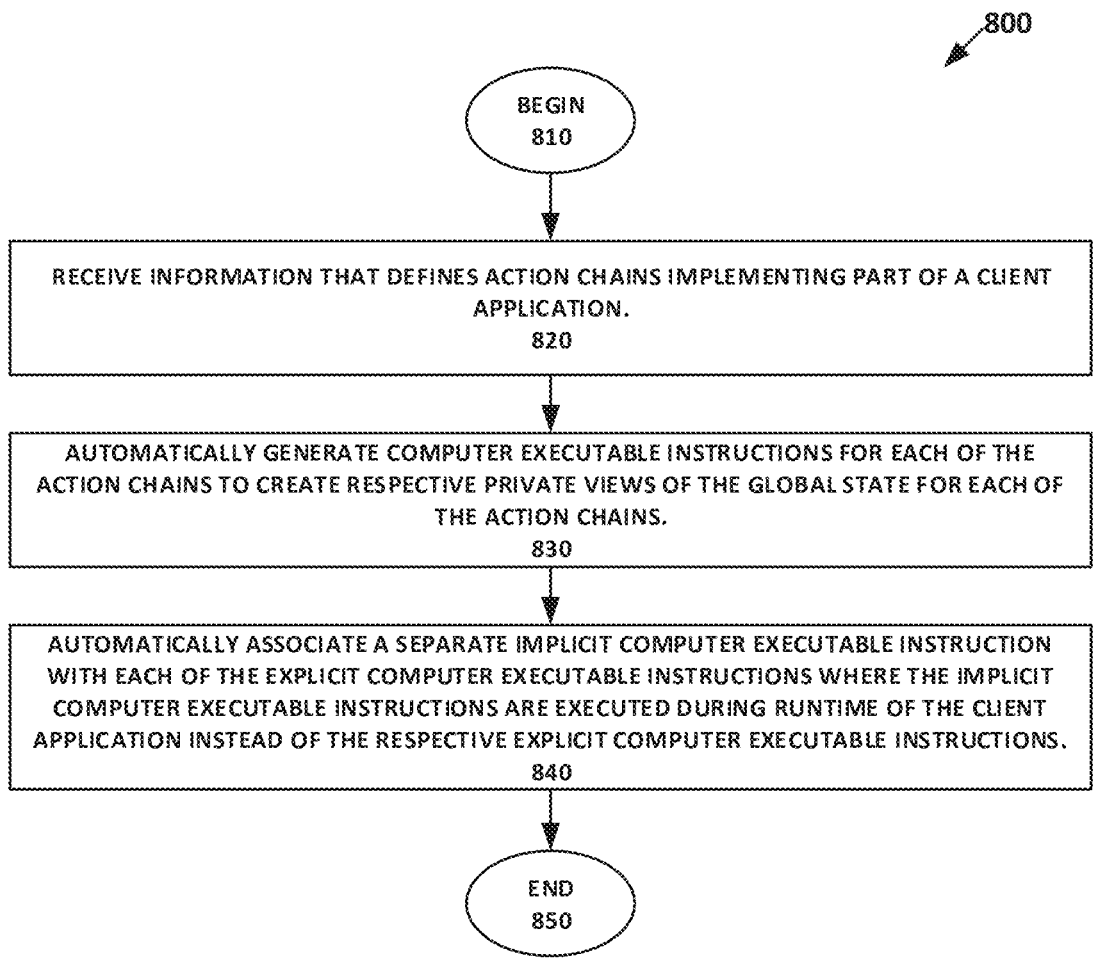
FIG. 8 depicts a flowchart of a method for providing deferred state mutation, according to one embodiment.

FIG. 8 depicts a flowchart of a method 800 for providing deferred state mutation, according to one embodiment.

At 810, the method begins.

According to one embodiment, the tool's user interface 211 depicted in FIG. 2 enables a developer to select whether to enable deferred state mutation. According to another embodiment, deferred state mutation is automatically provided without the developer specifying it.

At 820, information is received that defines action chains 110, 120, 130, 251 implementing part of a client application 250 depicted in FIGS. 1 and 2. The information defining the action chains is received at design time, as discussed herein. For example, icons depicted on a web page 400 (FIG. 4) of the tool 210's user interface 211 (FIG. 2) can be dragged and dropped to create a flow diagram that represents one or more sequences of actions in the action chain 440 (FIG. 4), as discussed herein.

The received information includes an explicit computer executable instruction to modify a global state (also known as a "global variable") associated with each action chain. An example of an explicit computer executable instruction is $Y=Y+1$ where Y is a global variable. The developer can specify the explicit computer execution instruction by typing explicit computer instruction "$Y=Y+1$" or could use some other mechanism, such as dragging and dropping visual representations, arrows to connect visual representations, typing in text and so on, to specify equivalent logic for the explicit computer instruction.

Web pages 400-700 (FIGS. 4-7) of the tool's user interface 211 (FIG. 2) provide other features enabling an unsophisticated developer to provide deferred state mutation capabilities, as discussed herein, for the user interface 252 (FIG. 2) that they are creating.

At 830, computer executable instructions are automatically generated for each of the action chains to create respective private views of the global state for each of the action chains. For example, referring to FIGS. 1-3, computer executable instructions for creating private views Y1-Y3, X1-X3, Z1, and Z2 of respective global variables Y, X, Z are generated. Examples of computer executable instructions for creating private views are wrappers 301, 302, 303. Although, the wrappers are created during runtime of the client application 250, the instructions that create the wrappers for a client application's user interface 252 can be part of the tool 210, can be generated at design time by the tool 210, or can be generated at runtime of the client application 250 based on instructions from the tool 210.

At 840, a separate implicit computer executable instruction is automatically associated with each of the explicit computer executable instructions where the implicit computer executable instructions are executed during runtime of the client application instead of the respective explicit computer executable instructions. The implicit computer executable instructions are generated during design time and are associated with respective explicit computer executable instructions during design time. An implicit computer executable instruction is a computer executable instruction that is an alternative to the explicit computer executable instruction specified by the developer of the client application 250 (FIG. 2). The implicit computer executable instruction can be created by logic (also referred to as "automatic computer executable instruction creation") provided by the design time tool 210 (FIG. 2). This logic could be executed during design time or run time. The logic may reside at the design time tool 210 (FIG. 2), the client application 250 (FIG. 2), or in a library that is accessed by either or both the design time tool 210 (FIG. 2) and the client application 250 (FIG. 2).

Assume that the developer creating the client application 250 (FIG. 2) using the tool's UI 211 (FIG. 2) specified the explicit computer executable instruction $Y=Y+1$ for one action chain, such as 110, and $C=Y$ in another action chain, such as 120 (FIG. 1), where Y is a global variable. Also assume, in this illustration, that C is a local variable to the second action chain 120 (FIG. 1). The first action chain 110's (FIG. 1) explicit computer executable instruction with the implicit computer instruction $Y1=Y1+1$ and the second action chain 120's (FIG. 1) explicit computer executable instruction $C=Y$ with $C=Y2$. In another embodiment, the explicit computer executable instruction is detected during runtime execution and execution is redirected to the implicit computer executable instruction.

In still another embodiment, the implicit computer executable instruction is created by using the explicit computer instruction as a template and substituting local variables for the global variables. For example, each of the occurrences of the global variables Y in $Y=Y+1$ are substituted with the local variable Y1. Further, the explicit computer executable instruction can be parsed to locate the global variables. The global variables can be in the wrapper and the corresponding private views can be determined. The private views can then be accessed instead of the global variables. The implicit computer executable instructions are then executed during runtime of the client application 250 instead of the respective explicit computer executable instructions.

At 850, the method ends.

An embodiment provides for configuring the client application to execute, during the runtime, an implicit computer executable instruction instead of an associated explicit computer executable instruction. For example, referring to FIG. 2, the tool 210 configures the client application 250 to execute an implicit computer executable instruction instead of an explicit computer executable instruction, as discussed herein.

An embodiment provides for displaying, in response to a signal specifying a user request, at least one of the explicit computer executable instructions; and not displaying an implicit computer executable instruction that corresponds with the at least one explicit computer executable instruction.

An embodiment provides for during runtime of the client application, displaying a web page for the client application in a browser of a client device communicating with the client application; generating an event in response to detecting user selection of a user interface control depicted in the web page; and starting a particular action chain of the action chains in response to the event. For example, referring to FIGS. 2 and 10, a web page for the user interface 252 of the client application 250 executing on an application server 1020 can be displayed in a browser of a client device 1085, 1070, 1070, 1090 communicating with the client application 250. An event is generated in response to detecting a user selection of a user interface control depicted in the web page of the user interface 252. A particular action chain in action chains 251 is started in response to the event.

An embodiment provides for creating a snapshot of global variables for the particular action in response to the starting of the particular action chain, wherein the snapshot includes local variables that are local to the particular action chain; and assigning values of the global variables to the local variables, wherein each of the local variables is assigned a value of one of the global variables. Referring to FIG. 3, examples of snapshots and wrappers, examples of local variables are X1-X3, Y1-Y3, Z1 and Z3, and examples of global variables are X, Y, and Z.

An embodiment provides for creating a wrapper with associations between each of the global variables and one of the local variables; and assigning the values of the global variables to the local variables based on the associations. FIG. 3 depicts wrappers 301-303 with global variables and local variables where for a given wrapper there is a one to one correspondence between the global variables X, Y, Z and local variables. More specifically, for wrapper 301, global variable X is mapped just to local variable X1, global variable Y is mapped just to local variable Y1, and global variable Z is napped just to Z1. Therefore, at any given point during execution of an action chain chains, a global variable will be mapped to just one local variable for that action chain.

An embodiment provides for modifying a local variable instead of a corresponding global variable during the execution of the action chain. For example, referring to FIG. 1, during the execution of action chain 110, the local variable Y1 would be modified instead of the corresponding global variable Y. Similarly, during the execution of action chain 120, the local variable Y2 would be modified instead of the corresponding global variable Y.

An embodiment provides for isolating each of the action chains and the corresponding local variables in respective partitions, wherein each of the action chains are isolated in separate partitions. For example, FIG. 1 depicts partitions 141-143 that isolate each of the action chains 110, 120, 130 and their respective local variables Y1, Y2, Y3.

An embodiment provides for executing the client application by a design time tool that performed the receiving, the automatically generating, and the automatically associating. For example, referring to FIGS. 2 and 8, the design time tool 210 can perform the receiving 820, the automatically generating 830, and the automatically associating 840 depicted in FIG. 8.

An embodiment provides for receiving information defining a plurality of parallel action chains 110, 120, 130 (FIG. 1) implementing part of a client browser application, wherein the received information includes an explicit computer executable instruction to modify a global state associated with one or more of the action chains; and automatically generating one or more environment instructions at a development phase for each of the one or more of the action chains 110, 120, 130, 251 (FIGS. 1 and 2) to create respective private views X1-X3, Y1-Y3, Z1, and Z2 (FIG. 1) of the global state X, Y, and Z (FIG. 1) for each of the one or more of the action chains, and for resolving a conflict in the global state. An example of a client browser application is client application 250 (FIG. 2). The client application 250 is a client browser application because it provides a user interface 252 (FIG. 2) of web pages that can be displayed in a browser of a client device, as discussed herein. An example of resolving a conflict in the global state is to prevent the conflict by creating the local variables, isolating them in respective partitions, and modifying local variables instead of corresponding global variables during the execution of their respective action chains. Further, the values of the local variables can be merged 170 (FIG. 1), as discussed herein.

An embodiment provides for creating a local variable by a smart wrapper when a global variable of an explicit computer executable instruction is being written to but not when the global variable is being read. For example, referring to FIG. 3, if an unsophisticated human developer specifies an explicit computer executable instruction to modify a value of the global variable Y at action 132, a smart wrapper 303b associated with action 132 will create a local variable Y3. The local variable Y3 is not created by wrapper 303a because action 131 does not assign a value to the corresponding global variable Y.

Illustration of a System

Figure 9:
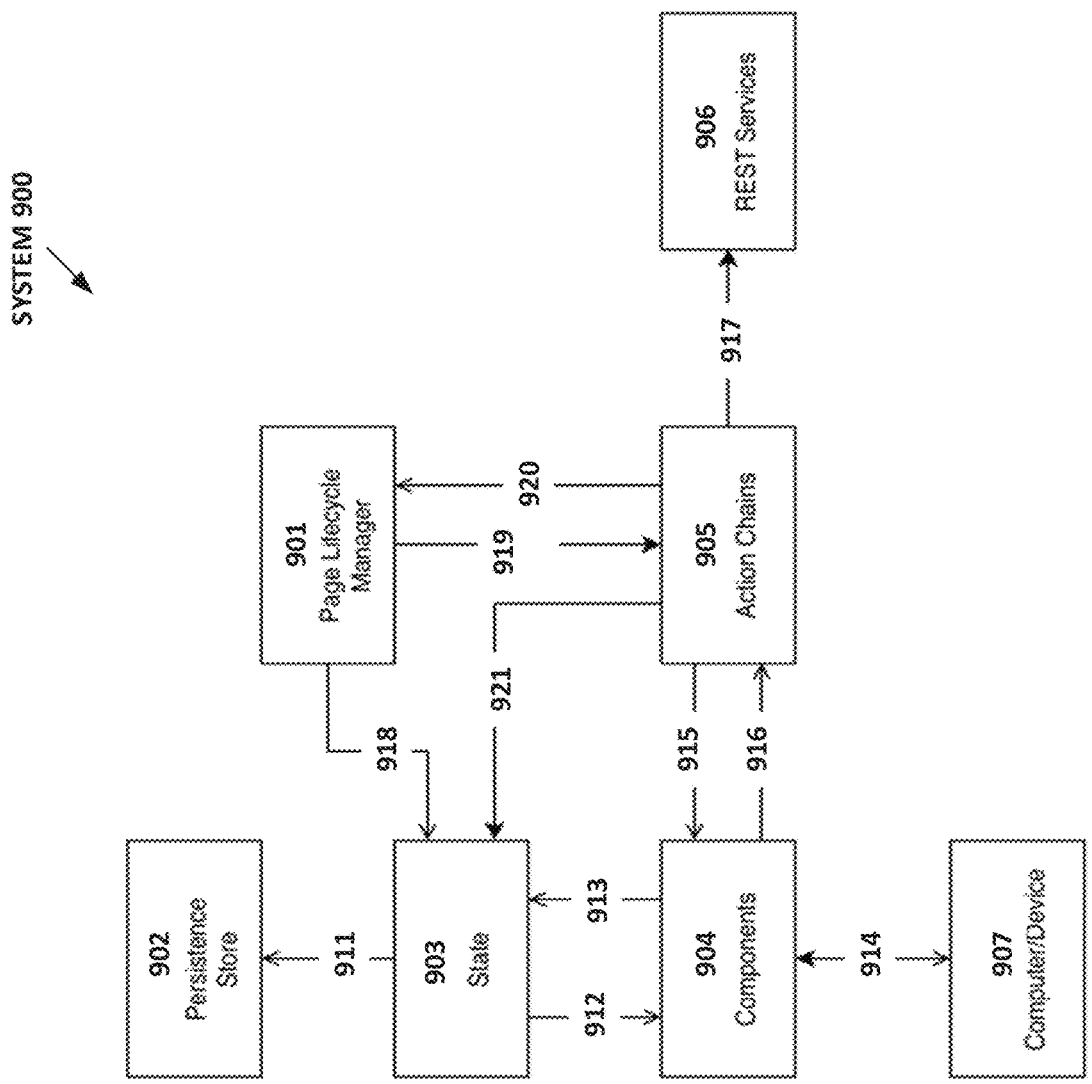
FIG. 9 depicts a system, according to one embodiment.

FIG. 9 depicts a system 900, according to one embodiment.

The page lifecycle manager 901 initializes and destroys parts of the state depending on which application UI is currently visible to the user. When it destroys state, it can save it to the persistence store (if configured) and when restoring state, it can load it from the persistence store.

Persistent Store 902 is where application state is persisted (on disk) between invocations of the application by the user.

State 903 provides the state in active use by the application (variables).

Components 904 provides the UI that includes buttons, text, images, etc. that the user interacts with.

Action Chains 905 provides the core flow of logic that drives the application (the processes).

Rest Services 906 provides external REST APIs.

Computer/Device 907 provides the browser or device that is controlling the UI.

The following is a description of the flow of operations 911-421 with respect to the entities 901-907 depicted in system 900:

Operation 911: The persistence store is used to initialize and save state between when the user is actively using the application.

Operation 912: State changes are reflected on components. For example, a text field bound to some state).

Operation 913: State changes can be triggered by components. For example, a text input updating state directly.

Operation 914: The user interacts with the UI from their device 907.

Operation 915: Action chains can call methods on the UI, such as telling a map to zoom.

Operation 916: UI can fire action chains to perform logic (i.e. button click).

Operation 917: Action chains are used to call REST services and to get data into and out of the system via those services.

Operation 918: Page lifecycle manager initializes and destroys state as the user navigates the application and displayed different UI.

Operation 919: Page lifecycle manager can fire action chains in response to navigation. For example, the user interacting with the device 907 can cause a page to be entered and this can fire an action chain to do work in response to that.

Operation 920: Action chains can cause navigation, such as activating different parts of the UI.

Operation 921: Action chains 905 communicates with state 903.

According to one embodiment, the user interface created by the system 900 can be executed in the browser of a client computer/device 907. The client computer/device that the created user interface executes may be the same client computer/device 907 that was used to create the user interface or a different client computer/device. The created user interface can be executed on multiple client computer/devices at different times or simultaneously.

As discussed herein, a design time tool is used for creating the user interface. According to one embodiment, the JSON files are created as part of creating the user interface. The JSON files are transported to the browser of a client computer/device using a well-known method of communication and interpreted by runtime for execution.

With respect to Deferred State Mutation the execution flow, according to one embodiment is:

An action chain is invoked (typically by 916). An action chain copies state via 921. When the action chain completes, it merges the state back also by 921.

Example Computer Environment

Figure 10:
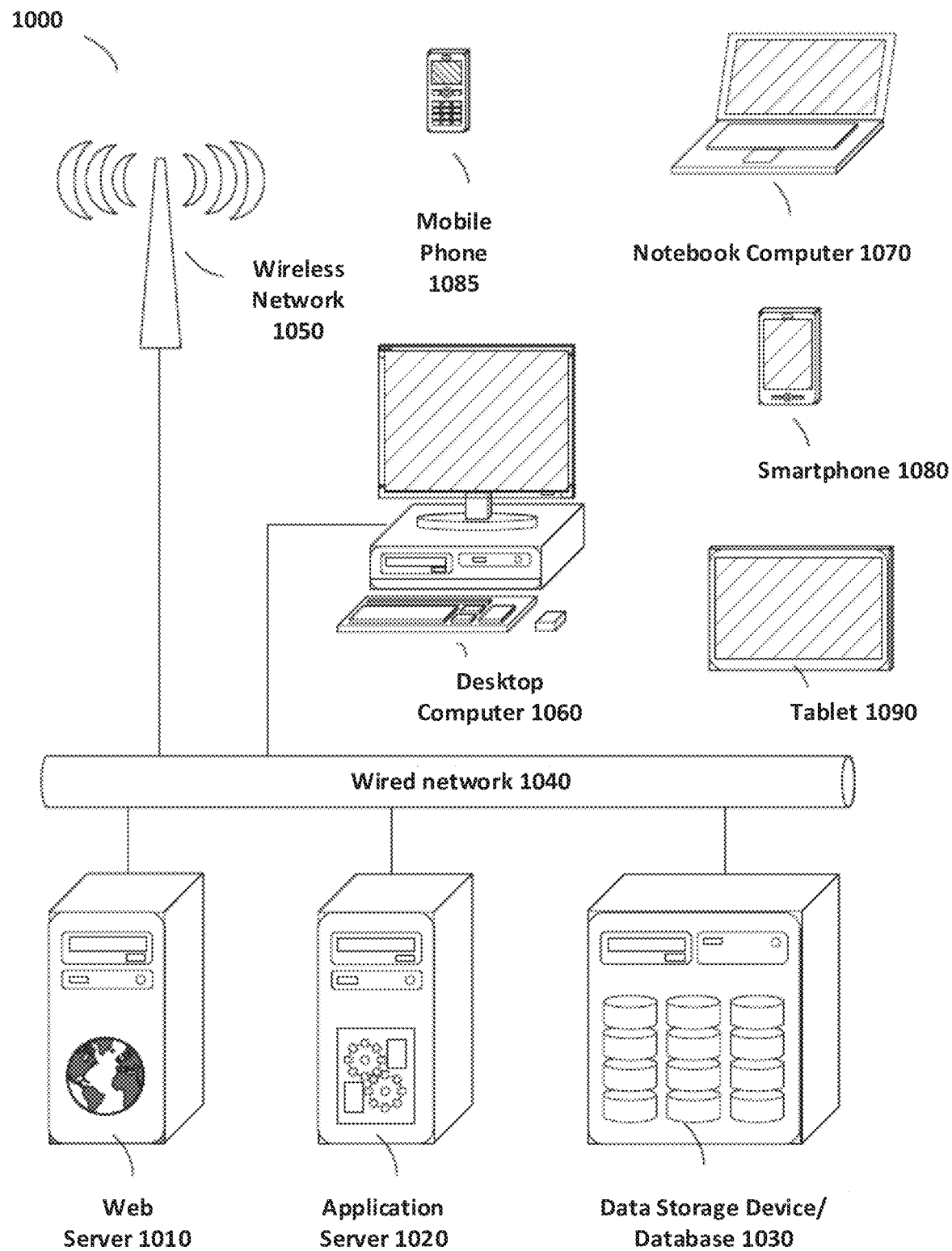
FIG. 10 is a general block diagram of a system and accompanying computing environment usable to implement the embodiments of Figures depicted herein, according to one embodiment.

FIG. 10 is a general block diagram of a system 1000 and accompanying computing environment usable to implement the embodiments of Figures depicted herein, according to one embodiment. The example system 1000 can support or running various hardware and/or software modules and associated methods discussed with reference to FIG. 9. Note that certain embodiments may be implemented using one or more standalone applications (for example, residing in a user device) and/or one or more web-based applications implemented using a combination of client-side and server-side code.

The general system 1000 includes user devices 1060-1090, including desktop computers 1060, notebook computers 1070, smartphones 1080, mobile phones 1085, and tablets 1090. The general system 1000 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 1000 is shown with five user devices, any number of user devices can be supported.

A web server 1010 is used to process requests from web browsers and standalone applications for web pages, electronic documents, enterprise data or other content, and other data from the user computers. The web server 1010 may also provide push data or syndicated content, such as RSS feeds, of data related to enterprise operations.

An application server 1020 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can be created using HTML (HyperText Markup Language), CSS (Cascading Style Sheets), and other web technology, including templating languages and parsers.

The data applications running on the application server 1020 are adapted to process input data and user computer requests and can store or retrieve data from data storage device or database 1030. Database 1030 stores data created and used by the data applications. In an embodiment, the database 1030 includes a relational database that is adapted to store, update, and retrieve data in response to SQL format commands or other database query languages. Other embodiments may use unstructured data storage architectures and NoSQL (Not Only SQL) databases.

In an embodiment, the application server 1020 includes one or more general-purpose computers capable of executing programs or scripts. In an embodiment, web server 1010 is implemented as an application running on the one or more general-purpose computers. The web server 1010 and application server 1020 may be combined and executed on the same computers.

An electronic communication network 1040-1050 enables communication between user computers 1060-1090, web server 1010, application server 1020, and database 1030. In an embodiment, networks 1040-1050 may further include any form of electrical or optical communication devices, including wired network 1040 and wireless network 1050. Networks 1040-1050 may also incorporate one or more local-area networks, such as an Ethernet network, wide-area networks, such as the Internet; cellular carrier data networks; and virtual networks, such as a virtual private network.

The system 1000 is one example for executing applications according to an embodiment of the invention. In another embodiment, web server 1010, application server 1020, and optionally database 1030 can be combined into a single server computer application and system. In a further embodiment, virtualization and virtual machine applications may be used to implement one or more of the web servers 1010, application server 1020, and database 1030.

In still further embodiments, all or a portion of the web and application serving functions may be integrated into an application running on each of the user computers. For example, a JavaScript application on the user computer may be used to retrieve or analyze data and display portions of the applications.

In a particular example embodiment, the user computing devices 1060-1090 run browsers, e.g., used to display the user interfaces. User interface may be viewed from a client computing device, such as a desktop computer 1060, notebook computer 1070, smartphone 580, mobile phone 1085, tablet 1090, of FIG. 10 and/or other computing devices.

In a particular example embodiment, browsers of the desktop computer 1060, notebook computer 1070, smartphone 1080, mobile phone 1085, tablet 1090 of FIG. 10 connect to the Internet, represented by the wired network 1040 and/or wireless network 1050 as shown in FIG. 10, to access one or more network-coupled servers, databases, and/or associated cloud-based functionality, as represented by the modules of FIG. 9. For example, one or more entities 901, 904, 905, and 906 can reside on an application server 1020. The client computer/device 907 may be implemented as one or more of user computing devices 1060-1090. One or more databases 1030 as shown in FIG. 10 may be used to host data, such as persistent store 902 and state 903, associated with FIG. 9. The networks used for FIG. 9 can be implemented as networks 1040. For example, according to one embodiment, a network 1040 can be used to communicate between the client computer/device 907 and components 904.

The network 220 in FIG. 2 can include a portion of the wireless network 1050 or the wired network 1040 or both. The client application 250 in FIG. 2 can reside on an application server 1020 and accessed from a user computing device 1060-1090. The tool 210 and the server applications 230, 240 can reside on a server 1010 or 1020. The tool's user interface 211 and the client application's user interface 252 can be displayed on a user computing device 1060-1090. The user interfaces 211, 252 may be displayed with a browser executing in a user computing device 1060-1090.

The client application 250, according to one embodiment, is executed by the tool 210. In this case, the client application 250 can reside in the tool 210 or in memory that the tool 210 accesses. The client application 250 can be accessed from one or more user computing devices 1060-1090 and the pages of the user interface 252 can be displayed in browsers of those respective user computing devices 1360-1390.

Figure 11:
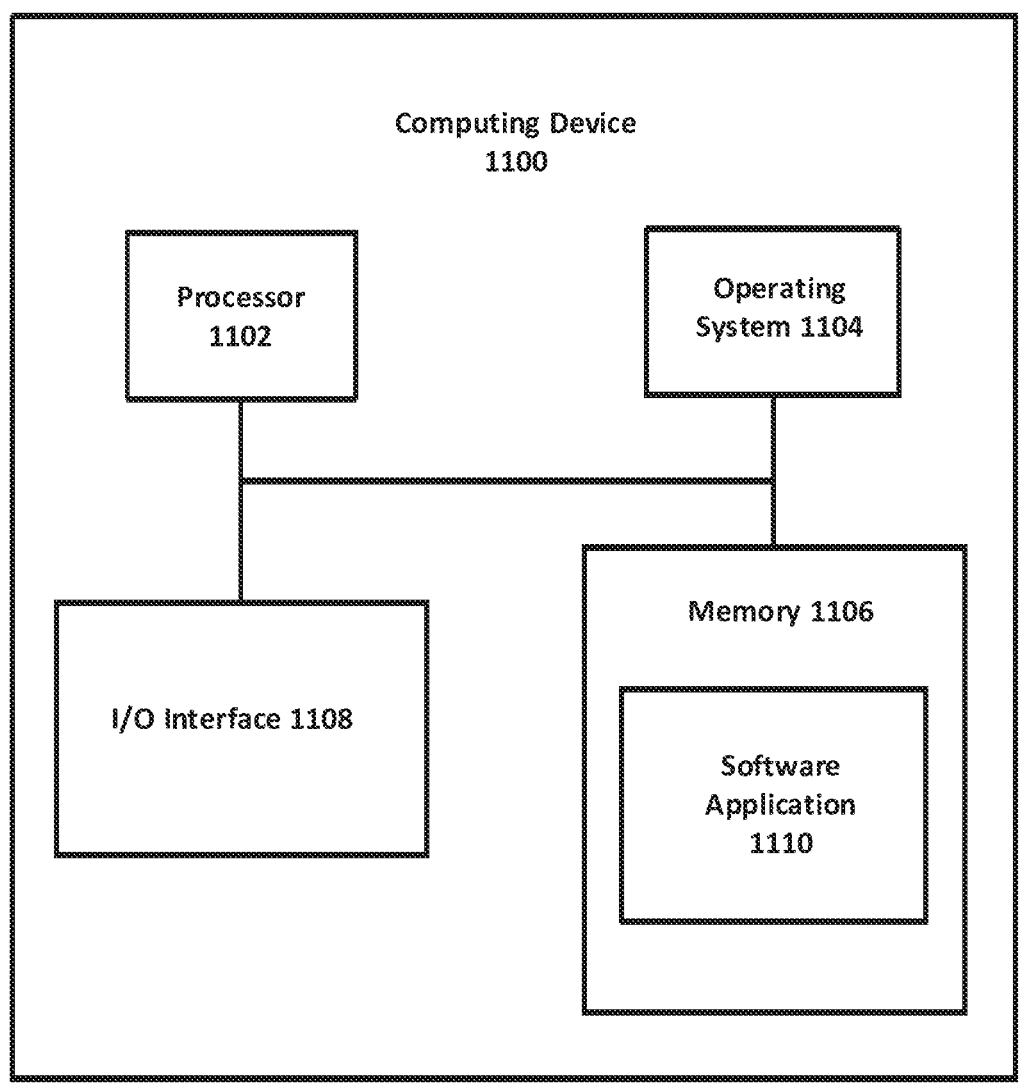
FIG. 11 is a general block diagram of a computing device usable to implement the embodiments described herein, according to one embodiment.

FIG. 11 is a general block diagram of a computing device 1100 usable to implement the embodiments described herein. While the computing device 1100 of FIG. 11 may be described as performing one or more of the steps in the embodiments herein, in other embodiments any suitable component or combination of components of the computing device 1100 or any suitable processor or processors associated with system 1100 may facilitate performing the steps.

FIG. 11 illustrates a block diagram of an example computing system 1100, which may be used for implementations described herein. For example, computing system 1100 may be used to implement user devices 1060-1090, and server devices 1010, 1020 of FIG. 10 as well as to perform the method implementations described herein. In some implementations, computing system 1100 may include a processor 1102, an operating system 1104, a memory 1106, and an input/output (I/O) interface 1108. In various implementations, processor 1102 may be used to implement various functions and features described herein, as well as to perform the method implementations described herein. While processor 1102 is described as performing implementations described herein, any suitable component or combination of components of system 1100 or any suitable processor or processors associated with system 1100 or any suitable system may perform the steps described. Implementations described herein may be carried out on a user device, on a server, or a combination of both.

Computing device 1100 also includes a software application 1110, which may be stored on memory 1106 or on any other suitable storage location or computer-readable medium. Software application 1110 provides instructions that enable processor 1102 to perform the functions described herein and other functions. The components of computing system 1100 may be implemented by one or more processors or any combination of hardware devices, as well as any combination of hardware, software, firmware, etc.

For ease of illustration, FIG. 11 shows one block for each of hardware processor 1102, operating system 1104, hardware memory 1106, I/O interface 1108, and software application 1110. These blocks 1102, 1104, 1106, 1108, and 1110 may represent multiple processors, operating systems, memories, I/O interfaces, and software applications. In various implementations, computing system 1100 may not have all of the components shown and/or may have other elements including other types of components instead of, or in addition to, those shown herein.

A Computer Readable Medium and an Apparatus

Unless otherwise specified, any one or more of the embodiments described herein can be implemented using processor readable instructions which reside, for example, in non-transitory processor-readable storage device of a computer system or like device. The non-transitory processor-readable storage device can be any kind of physical memory that instructions can be stored on. Examples of the non-transitory processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within non-transitory processor-readable storage device of a computer system and are executed by one or more processors of the computer system. When executed, the instructions cause a computer system to implement the functionality of various embodiments of the present invention. For example, the instructions can be executed by a processor. The processor is a hardware processor, such as a central processing unit, associated with the computer system. The non-transitory processor-readable storage device is hardware memory and the one or more processors are hardware processors. According to one embodiment, a non-transitory processor-readable storage device is a tangible physical device.

An embodiment provides a design time tool that provides deferred state mutation, comprising: one or more processors; and a non-transitory processor-readable storage device including instructions for: receiving information defining action chains implementing part of a client application, wherein the received information includes an explicit computer executable instruction to modify a global state associated with each action chain; automatically generating computer executable instructions for each of the action chains to create respective private views of the global state for each of the action chains; and automatically associating a separate implicit computer executable instruction with each of the explicit computer executable instructions, wherein the implicit computer executable instructions are executed during runtime of the client application instead of the respective explicit computer executable instructions.

CONCLUSION

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable storage device including instructions for a method of providing deferred state mutation, the method comprising:

providing a design visual development time tool with a user interface, wherein the user interface provides a set of icon boxes and icon arrows for user definition of actions in action chains of a client application, and wherein the action chains include a first action chain and a second action chain;

receiving, performed by the user interface, information defining the action chains implementing part of the client application, wherein the received information includes explicit computer executable instructions, wherein the explicit computer executable instructions include a first explicit computer executable instruction and a second explicit computer executable instruction, wherein at least one of the explicit computer executable instructions is associated with each of the actions in the action chains, wherein the first action chain has the first explicit computer executable instruction and the second action chain has the second explicit computer executable instruction for modifying a global state associated with each of the action chains, wherein the global state is not associated with a subset of the explicit computer executable instructions, wherein the information defining each of the action chains further includes at least a subset of the icon boxes and at least a subset of the icon arrows joining the at least subset of icon boxes to create visual representations of the action chains, wherein each of the actions in the action chains is defined with one of the subsets of the icon boxes, and wherein the first action chain has a different design of icon boxes and icon arrows than the second action chain;

automatically generating, performed by the design visual development time tool, computer executable instructions for each of the action chains to create respective private views of the global state for each of the action chains;

creating a first implicit computer executable instruction using the first explicit computer executable instruction as a first template;

creating a second implicit computer executable instruction using the second explicit computer executable instruction as a second template, wherein the first template is different from the second template;

automatically associating, performed by the design visual development time tool, the first implicit computer executable instruction with the first explicit computer executable instruction and the second implicit computer executable instruction with the second explicit computer executable instruction to create respective private views of the global state for each of the action chains; and
executing, performed by the design visual development tool, the client application including executing the action chains in parallel, wherein the first and second implicit computer executable instructions are executed during the executing of the client application instead of the first and second explicit computer executable instructions.

2. The non-transitory processor-readable storage device as recited by claim 1, wherein the method further comprises:
configuring the client application to execute, during the executing of the client application, an implicit computer executable instruction instead of an associated explicit computer executable instruction.

3. The non-transitory processor-readable storage device as recited by claim 1, wherein the method further comprises:
displaying, in response to a signal specifying a user request, at least one of the explicit computer executable instructions; and
not displaying an implicit computer executable instruction that corresponds with the at least one explicit computer executable instruction.

4. The non-transitory processor-readable storage device as recited by claim 1, wherein the method further includes:
during the executing of the client application,
displaying a web page for the client application in a browser of a client device communicating with the client application;
generating an event in response to detecting user selection of a user interface control depicted in the web page; and
starting a particular action chain of the action chains in response to the event.

5. The non-transitory processor-readable storage device as recited by claim 4, wherein the method further includes:
creating a snapshot of global variables for the particular action in response to the starting of the particular action chain, wherein the snapshot includes local variables that are local to the particular action chain; and
assigning values of the global variables to the local variables, wherein each of the local variables is assigned a value of one of the global variables.

6. The non-transitory processor-readable storage device as recited by claim 5, wherein the method further includes:
creating a wrapper with associations between each of the global variables and one of the local variables; and
assigning the values of the global variables to the local variables based on the associations.

7. The non-transitory processor-readable storage device as recited by claim 5, wherein the method further includes:
modifying a local variable instead of a corresponding global variable during the execution of the action chain.

8. The non-transitory processor-readable storage device as recited by claim 5, wherein the method further comprises:
isolating each of the action chains and corresponding local variables in respective partitions, wherein each of the action chains are isolated in separate partitions.

9. The non-transitory processor-readable storage device as recited by claim 1, wherein the method further comprises:
creating a local variable by a smart wrapper when a global variable of an explicit computer executable instruction is being written to but not when the global variable is being read.

10. A method of providing deferred state mutation, the method comprising:

providing a design visual development time tool with a user interface, wherein the user interface provides a set of icon boxes and icon arrows for user definition of actions in action chains of a client application, and wherein the action chains include a first action chain and a second action chain;
receiving, performed by the user interface, information defining the action chains implementing part of the client application, wherein the received information includes explicit computer executable instructions, wherein the explicit computer executable instructions include a first explicit computer executable instruction and a second explicit computer executable instruction, wherein at least one of the explicit computer executable instructions is associated with each of the actions in the action chains, wherein the first action chain has the first explicit computer executable instruction and the second action chain has the second explicit computer executable instruction for modifying a global state associated with each of the action chains, wherein the global state is not associated with a subset of the explicit computer executable instructions, wherein the information defining each of the action chains further includes at least a subset of the icon boxes and at least a subset of the icon arrows joining the at least subset of icon boxes to create visual representations of the action chains, wherein each of the actions in the action chains is defined with one of the subsets of the icon boxes, and wherein the first action chain has a different design of icon boxes and icon arrows than the second action chain;
automatically generating, performed by the design visual development time tool, computer executable instructions for each of the action chains to create respective private views of the global state for each of the action chains;
creating a first implicit computer executable instruction using the first explicit computer executable instruction as a first template;
creating a second implicit computer executable instruction using the second explicit computer executable instruction as a second template, wherein the first template is different from the second template;
automatically associating, performed by the design visual development time tool, the first implicit computer executable instruction with the first explicit computer executable instruction and the second implicit computer executable instruction with the second explicit computer executable instruction to create respective private views of the global state for each of the action chains; and
executing, performed by the design visual development tool, the client application including executing the action chains in parallel, wherein the first and second implicit computer executable instructions are executed during the executing of the client application instead of the first and second explicit computer executable instructions.

11. The method as recited by claim 10, wherein the method further comprises:
configuring the client application to execute, during the executing of the client application, an implicit computer executable instruction instead of an associated explicit computer executable instruction.

12. The method as recited by claim 10, wherein the method further comprises:

displaying, in response to a signal specifying a user request, at least one of the explicit computer executable instructions; and not displaying an implicit computer executable instruction that corresponds with the at least one explicit computer executable instruction.

13. The method as recited by claim 10, wherein the method further includes:

during the executing of the client application, displaying a web page for the client application in a browser of a client device communicating with the client application;

generating an event in response to detecting user selection of a user interface control depicted in the web page; and starting a particular action chain of the action chains in response to the event.

14. The method as recited by claim 13, wherein the method further includes:

creating a snapshot of global variables for the particular action in response to the starting of the particular action chain, wherein the snapshot includes local variables that are local to the particular action chain; and assigning values of the global variables to the local variables, wherein each of the local variables is assigned a value of one of the global variables.

15. The method as recited by claim 14, wherein the method further includes:

creating a wrapper with associations between each of the global variables and one of the local variables; and assigning the values of the global variables to the local variables based on the associations.

16. The method as recited by claim 14, wherein the method further includes:

modifying a local variable instead of a corresponding global variable during the execution of the action chain.

17. The method as recited by claim 14, wherein the method further comprises:

isolating each of the action chains and corresponding local variables in respective partitions, wherein each of the action chains are isolated in separate partitions.

18. The method as recited by claim 10, wherein the method further comprises:

creating a local variable by a smart wrapper when a global variable of an explicit computer executable instruction is being written to but not when the global variable is being read.

19. A design time tool that provides deferred state mutation, comprising:

one or more processors; and a non-transitory processor-readable storage device including instructions for:

providing a design visual development time tool with a user interface, wherein the user interface provides a set of icon boxes and icon arrows for user definition of actions in action chains of a client application, and wherein the action chains include a first action chain and a second action chain;

receiving, performed by the user interface, information defining the action chains implementing part of the client application, wherein the received information includes explicit computer executable instructions, wherein the explicit computer executable instructions include a first explicit computer executable instruction and a second explicit computer executable instruction, wherein at least one of the explicit computer executable instructions is associated with each of the actions in the action chains, wherein the first action chain has the first explicit computer executable instruction and the second action chain has the second explicit computer executable instruction for modifying a global state associated with each of the action chains, wherein the global state is not associated with a subset of the explicit computer executable instructions, wherein the information defining each of the action chains further includes at least a subset of the icon boxes and at least a subset of the icon arrows joining the at least subset of icon boxes to create visual representations of the action chains, wherein each of the actions in the action chains is defined with one of the subsets of the icon boxes, and wherein the first action chain has a different design of icon boxes and icon arrows than the second action chain;

automatically generating, performed by the design visual development time tool, computer executable instructions for each of the action chains to create respective private views of the global state for each of the action chains;

creating a first implicit computer executable instruction using the first explicit computer executable instruction as a first template;

creating a second implicit computer executable instruction using the second explicit computer executable instruction as a second template, wherein the first template is different from the second template;

automatically associating, performed by the design visual development time tool, the first implicit computer executable instruction with the first explicit computer executable instruction and the second implicit computer executable instruction with the second explicit computer executable instruction to create respective private views of the global state for each of the action chains; and executing, performed by the design visual development tool, the client application including executing the action chains in parallel, wherein the first and second implicit computer executable instructions are executed during the executing of the client application instead of the first and second explicit computer executable instructions.

* * * * *